United States Patent Office 3,325,346
Patented June 13, 1967

3,325,346
PROCESS OF MAKING PAPER USING REACTION PRODUCT OF POLYETHYLENEIMINE AND POLYISOCYANATE
Hans Osberg, Port Washington, N.Y., assignor to Chemirad Corporation, East Brunswick, N.J., a corporation of Delaware
No Drawing. Filed June 26, 1964, Ser. No. 378,458
20 Claims. (Cl. 162—164)

The invention relates to polyisocyanate products and improved cellulose fibrous products, such as paper, having a combination of desirable properties, in particular increased strength. The invention also relates to methods for manufacturing these improved cellulose products. More specifically, the invention concerns the reaction product of an organic polyisocyanate and polyethylene imine, a method for making it, a process for treating cellulose fibers with a polyalkylene imine and an organic polyisocyanate and the resulting improved products.

Improved paper products are becoming increasingly necessary in modern applications. In an attempt to fill this need, it has been recently suggested to use polyethylene imine as a beater additive in making paper. But the paper products still have shortcomings, particularly in wet stiffness, in applications where more exacting requirements must be met.

It is, therefore, an important object of the invention to provide cellulosic products having a combination of improved properties, in particular good sheet formation, greater strength, such as resistance to bursting, dry and wet stiffness, and other desirable properties. The paper products of the invention are ideally suited for packaging application, notably for paperboard products which are exposed to dampness, refrigeration or freezing. The invention provides a reaction product of polyethylene imine and an organic polyisocyanate which is useful in the treatment of cellulose fibers to give improved cellulose products. The invention also provides a versatile method for the treatment of cellulose fibers, such as in the making of paper, to obtain these improved products. The process of the invention is also particularly well suited to manufacture unsized paper, but may also be used for preparation of sized paper utilizing either acidic or neutral sizing agents.

A product of the invention is the polymer reaction product of a polyalkylene imine, such as polyethylene imine (hereinafter designated as PEI) and an organic polyisocyanate. The PEI which is used is a water-soluble PEI, which is reacted with the polyisocyanate. For completeness of reaction there is used 1 mole of PEI for each isocyanato group in the polyisocyanate. Thus for a diisocyanate there are used at least 2 moles of PEI. To promote the reaction the temperature may be maintained between 20° and 100° C., more commonly 20° and 60° C. Conveniently the reaction is carried out in a solvent for the reactants such as in water; lower alkanols, such as methanol, ethanol; aromatic and aliphatic hydrocarbons, such as benzene, toluene, xylene, hexane; and the like. The reaction pH is alkaline. The polymer reaction product is a water-insoluble gel. A preferred group of products include the reaction product of PEI and a diisocyanate of 4 to 10 carbon atoms such as an aliphatic diisocyanate of 4 to 8 carbon atoms or an aromatic diisocyanate of 6 to 10 carbon atoms. The product is useful as a film or coating on various substrates, such as metals, glass, cellulosic materials, like paper and textiles. It is useful in textile sizing and as an adhesive for bonding various substrates. Upon heating permanent cross-linking and bonding can be effectuated between the substrate and the PEI-polyisocyanate product.

Another important aspect of the invention concerns a process for treating an aqueous suspension or dispersion of cellulose fibers with a polyethylene imine and the organic polyisocyanate, without first forming the polymer product of PEI and the polyisocyanate. The water-soluble polyethylene imine which is used in the invention, in conjunction with the isocyanate, is a polymer which is substantive, i.e., it is characterized by substantial exhaustion onto the paper fibers and even distribution thereon without the need of addition of a precipitating or fixing agent to the cellulose fibers. The polymer retains its substantivity under processing conditions. The reaction of the polyethylene imine with the cellulose fibers is enhanced, in a synergistic manner, by the presence of the polyisocyanate. The polyisocyanate, moveover, apparently reacts both with the polyethylene imine and with the fibrous pulp thus yielding the desirable products of the invention.

In accordance with the invention, there is used in conjunction with the polyethylene imine, any organic polyisocyanate, including di-, and tri-isocyanates, both aliphatic (including cycloalkyl) and aromatic. The latter may have one or a plurality of benzene groups in the molecule condensed rings such as naphthalene and anthracene. For convenience, the polyisocyanate is a liquid, i.e., it has a melting point not above 30° C. The polyisocyanate may also be added to the fiber dispersion as a solution, as by dissolving it in a suitable solvent. In practice, polyisocyanates having a maximum of about 20 carbon atoms, in addition to the carbon of the isocyanato group, are quite satisfactory. Typical polyisocyanates are the following: butylene-1,4-diisocyanate, ethylenediisocyanate, trimethylenediisocyanate, butylene-2,3-diisocyanate, cyclo-hexylene-1,2-diisocyanate, hexamethylenediisocyanate, m-phenylenediisocyanate, p-phenylenediisocyanate, o-phenylenediisocyanate, 2,4-toluenediisocyanate, 2,6-toluenediisocyanate, methylene-bis(4-phenylisocyanate), diphenyl-3,3'-dimethyl-4,4'-diisocyanate, p-dixylyl methane-4,4'-diisocyanate, naphthalene 1,4-diisocyanate, naphthalene 1,5-diisocyanate, xylylenediisocyanate, benzene-1,2,4-triisocyanate, and the like. Mixtures of polyisocyanates may be used.

The process of the invention for treating the cellulose fibers comprises adding the polyalkylene imine and the polyisocyanate to an aqueous suspension of the fibers. For optimum results, contact between the fibers in suspension and the polymer and the isocyanate should be promoted to insure fullest adsorption. The polymer and the isocyanate may be added to a dilute aqueous suspension of paper pulp, as in the beater stock chest, fan pump, and so forth of a papermaking system, with agitation or mixing.

In producing fibrous products in accordance with the invention any suitable type of fibrous material may be employed, such as cotton fibers, cotton linters, wool or rag fibers as well as asbestos or mineral fibers. The invention is particularly valuable for the preparation of modified paper or paperboard sheets from cellulosic fibers in the form of bleached or unbleached wood pulps, including sulfite, kraft, soda, semi-chemical, and groundwood pulps, as well as rag pulp, rope pulp, jute pulp, and the like. The pulp may be unbeaten, highly beaten or lightly beaten before the treatment.

The pulp slurry in water may be acidic, neutral or alkaline. The preferred pH range is on the alkaline side from 7 to 11, preferably the pH ranges from 7.5 to 10. For adjustments to the alkali side, hydroxides of the alkali metals and alkaline earth metals, such as sodium or potassium, may be used.

The polyethylene imine resin may be used in the aqueous suspension of fibers as a dilute aqueous solution, over a wide range of concentration, as from 0.01 to 10%.

The amount of polymer to be added will vary with a number of factors including the degree of improvement desired. In most cases, from about 0.01 to about 5% of the polymer, based on the dry weight of fiber, gives satisfactory results. A desirable range amount is from 0.05 to 0.5%. It is an advantage of the process of the invention that comparatively small amounts of the polymer are effective to yield improved paper products since the effect of the polymer is enhanced by the isocyanate. But larger amounts, such as 50% of the weight of the fiber, may also be used.

The amount of polyisocyanate that may be used also may be varied considerably. It has been found satisfactory to use about 0.04 to 10% of polyisocyanate based on the dry weight of the fibers. Generally, the ratio of polyethylene imine to polyisocyanate may vary from 1 to 1 to 1 to 10, respectively. A ratio of 1 to 4 of polymer to polyisocyanate is very satisfactory. If desired, however, the polymer can be used in amounts exceeding the polyisocyanate.

The papermaking process of the present invention is applicable to any type of hydrated cellulose fiber at any convenient consistency of the fibrous suspension. The preferred consistency is that which promotes rapid and uniform distribution and contacting of the additives and the fibers. The consistency of the paper pulp may be as low as 0.1% or as high as 10%. Preferably the consistency is between 0.5% to 4%, based on the dry weight of the fibers. Preferably, the fibrous suspension should be stirred for some time to promote uniform distribution of the polyethylene imine and polyisocyanate through the suspension and allow adsorption to go to substantial equilibrium.

The polyalkylene imine and polyisocyanate may be added to the suspension of cellulose fibers in any order desired. The polymer may be added first, followed by the polyisocyanate; or the reverse procedure may be followed. Both additives may also be added simultaneously or they may be added to separate portions of the fiber suspension and then combined by admixing to the main batch of fiber suspension. A preferred procedure comprises adding the polyethylene imine to the fiber suspension causing adsorption thereto and then adding the isocyanate to the fiber dispersion. A reaction product of the fiber, polyethylene imine and polyisocyanate is thus formed.

After deposition of the polymer particles is complete, the fibers may be formed into a sheet on any suitable equipment, such as on any of the various types of papermaking equipment including laboratory types having sieves or screens for making handsheets as well as commercial machines, such as Fourdrinier or Cylinder machines. The cellulosic web is dried at temperatures which are generally sufficient to develop the properties of the polymer and isocyanate. To complete the reaction of the polymer and polyisocyanate, and the reaction with the cellulose, it is desirable to heat the treated paper at a temperature in the range of 100° to 250° C., generally 100° to 150° C., or, alternatively, to permit the reaction to go to completion while the paper is reeled and in storage for several days.

The process of the invention may be carried out in the presence or in conjunction with conventional sizing materials, or other conventional pulp additives such as pigments or fillers, such as titanium dioxide, talc or clays. Likewise, if desired, there may be used an emulsifier or dispersing agent as an aid in dispersing the cellulose fibers, such as non-ionic emulsifiers.

In the following examples which are illustrative of the invention, all percentages are expressed on solids basis, based on the weight of the dry fiber and all parts are by weight.

EXAMPLE 1

(a) One part of polyethyleneimine (PEI) (dissolved in water to give a 0.1% solution) is mixed with 1.5 parts of hexamethylene diisocyanate (a 10% aqueous solution) at a temperature of 25–30° C. A water-insoluble gel is formed. It is a tacky polymer material. It is useful as an adhesive.

(b) Likewise, following the procedure of part (a) the reaction of PEI and tetramethylene diisocyanate forms a water-insoluble gel.

EXAMPLE 2

(a) Following the procedure of Example 1, PEI (as a 0.1% solution in water) is reacted with 1.5 parts of toluene diisocyanate in benzene. The gel-like polymer is insoluble in water and in benzene.

(b) Likewise, xylylenediisocyanate yields a water-insoluble product with PEI.

EXAMPLE 3

(a) A slurry of unbleached softwood Kraft pulp of a consistency of 2.2% is beaten to a 30° Schopper-Riegler (SR) freeness and diluted to a consistency of 0.24% in a sheet machine proportioner, prior to formation to hand sheets of 40 lb. basis weight (24″ x 36″/500 ream). The pH of the dispersion is 8.0. The dilute stock is stirred, the wet web is formed in a sheet mold, pressed with a cylinder press, dried over a drum dryer for 3 minutes at 95° C., cured for 10 minutes at 120° C., conditioned at 70° C. and 50% relative humidity prior to testing. In this part no additive is added. The sheet serves as a control.

(b) Part (a) is repeated, but 0.1% PEI is added to the pulp dispersion, the sheets formed, dried, cured, and tested.

(c) Part (a) is repeated, but 0.39% hexamethylene diisocyanate (HMD) is admixed, the sheets formed, cured, dried, and tested.

(d) Part (a) is repeated, but 0.37% toluene diisocyanate (TDI) is added to the pulp dispersion, the sheets formed, cured, dried, and tested.

The results of Example 3, Parts (a), (b), and (c) are reported in Table I.

EXAMPLE 4

The procedure of Example 3 is followed, 0.1% PEI and 0.39% hexametyhlene disocyanate are added simultaneously to the dilute pulp suspension. The sheets are formed and cured as shown in Example 3. They have improved strength properties both under dry and wet conditions. The results are shown in Table I.

Substitution of hexamethylene diisocyanate by an equivalent amount of tetramethylenediisocyanate yields paper sheets of improved properties.

EXAMPLE 5

The pulp slurry is formed as in Example 3. There are added 0.1% PEI and 0.39% hexamethylene diisocyanate to separate portions of the pulp slurry, then combined by addition to the main batch prior to sheet formation. The sheets show improved stiffness under dry and wet conditions. The results are shown in Table I.

Likewise, treatment with butylene-1,4-diisocyanate and PEI give paper sheets of improved properties.

EXAMPLE 6

Following the same general procedure to make the paper slurry, there are added 0.1% of PEI followed by 0.39% of toluene diisocyanate. The formed sheets are tested and show improved strength properties such as dry and wet stiffness. Likewise, the treated paper sheet also has improved dry tensile strength and increased burst resistance. Stiffness data is shown in Table I.

Likewise, xylylenediisocyanate and PEI treated paper stock yield sheets of improved properties.

EXAMPLE 7

The procedure of Example 4 is followed using 0.37% of toluene isocyanate in conjunction with the PEI. The treated paper sheet has improved dry and wet stiffness. The results are shown in Table I. Dry tensile strength and resistance to burst are also increased.

Likewise, using a mixture of equal parts of p- and o-phenylenediisocyanate and PEI results in a paper sheet having improved properties.

EXAMPLE 8

The procedure of Example 5 is followed using 0.37% of toluene diisocyanate and 0.1% of PEI. Sheets having improved dry and wet stiffness are obtained. The results are shown in Table I.

TABLE I.—PROPERTIES OF TREATED PAPER

| Example | Additive | Dry Stiffness | | Wet Stiffness | |
|---|---|---|---|---|---|
| | | Mg. | Percent I | Mg. | Percent I |
| 3a | None | 120 | | 9.4 | |
| 3b | PEI | 119 | | 8.0 | |
| 3c | HMD | 110 | | 9.1 | |
| 3d | TDI | 102 | | 8.0 | |
| 4 | PEI+HMD | 132 | 11.7 | 11 | 17.0 |
| 5 | PEI+HMD | 147 | 22.4 | 13.0 | 38.3 |
| 6 | PEI+TDI | 152 | 26.7 | 12.0 | 27.7 |
| 7 | PEI+TDI | 149 | 24.2 | 13.0 | 38.3 |
| 8 | PEI+TDI | 135 | 12.5 | 14.0 | 49.0 |

Percent I=Percent Improvement over best control.

EXAMPLE 9

The same procedure to make the paper slurry is followed adding first 0.39% of hexamethylene diisocyanate to the stock, followed by 0.1% of PEI. The sheets have improved dry tensile strength, increased dry and wet stiffness and improved burst resistance.

In the evaluation of the paper sheets, the following testing methods were used:

Tensile strength

Tensile strength is determined using a Scott Model X-3 Tensile Tester, the wet tensile strength being determined after water soaking for 15 minutes at room temperature. The basis weight-corrected average of 2 tests were reported, the wet tensile strength being reported as relative wet strength (percent wet/dry).

Burst strength

Burst strength is determined with a Mullen Tester with 4 results, averaged and corrected for basis weight variations.

Tear strength

Tear strength is determined using an Elmendorf Tear Tester and is reported on the basis weight-corrected average of 4 results.

Stiffness data

Stiffness data is reported as the basis weight-corrected average of 6 results for dry stiffness and 10 results for wet stiffness, the latter being reported as percent wet/dry. The instrument used is an MIT Tester.

What is claimed is:

1. The reaction product of polyethyleneimine and an organic diisocyanate having 4 to 10 carbon atoms.
2. The product of claim 1 in which the diisocyanate is toluene diisocyanate.
3. The product of claim 1 in which the diisocyanate is hexamethylene diisocyanate.
4. The process which comprises reacting polyethyleneimine in an aqueous alkaline medium with toluene diisocyanate.
5. The process which comprises reacting polyethyleneimine in an aqueous alkaline medium with hexamethylene diisocyanate.
6. The water-insoluble gel which is the reaction product of an organic diisocyanate having 4 to 10 carbon atoms and polyethyleneimine.
7. A process which comprises treating an aqueous suspension of cellulosic fibers with polyethyleneimine and an organic polyisocyanate.
8. A process which comprises treating an aqueous suspension of a paper pulp with polyethyleneimine in the presence of an organic polyisocyanate.
9. A process which comprises treating an aqueous suspension of a paper pulp with polyethyleneimine and an organic polyisocyanate at a basic pH.
10. The process of claim 8 in which there is used an excess of polyisocyanate over the amount of polyethyleneimine used.
11. A process for making improved paper products which comprises treating an aqueous suspension of paper pulp with polyethyleneimine and an organic polyisocyanate, forming a paper sheet, and curing the sheet, thereby giving a paper product having increased strength.
12. The process of claim 8 in which the polyisocyanate is a liquid.
13. The process of claim 8 in which the polyisocyanate is an aromatic diisocyanate.
14. The process of claim 13 in which the isocyanate is toluene diisocyanate.
15. The process of claim 8 in which the polyisocyanate is an aliphatic diisocyanate.
16. The process of claim 15 in which the isocyanate is hexamethylene diisocyanate.
17. A process which comprises adding polyethyleneimine to an aqueous suspension of paper pulp, having the polyethyleneimine absorb on the fibers, adding an organic polyisocyanate to the polyethyleneimine-treated cellulose fibers in suspension and making a paper sheet with the treated fibers.
18. A cellulose fiber product having improved stiffness comprising cellulose fibers treated with polyethyleneimine and an organic polyisocyanate.
19. A paper product having improved stiffness comprising cellulose fibers treated with polyethyleneimine and an organic diisocyanate.
20. The product of claim 18 which is unsized.

References Cited

UNITED STATES PATENTS

| | | | |
|---|---|---|---|
| 3,081,219 | 3/1963 | Drennen et al. | 162—168 |
| 3,084,093 | 4/1963 | Humiston | 162—168 |
| 3,112,283 | 11/1963 | Hansen et al. | 260—17.4 |
| 3,137,664 | 6/1964 | Shulman et al. | 260—17.4 |

WILLIAM H. SHORT, *Primary Examiner.*

J. NORRIS, *Assistant Examiner.*